Jan. 11, 1966 M. ARTZT 3,229,033

VARIABLE VELOCITY HALFTONE FACSIMILE SYSTEM

Filed Feb. 26, 1963 6 Sheets-Sheet 1

INVENTOR,
MAURICE ARTZT

BY Harry M. Saragovitz

ATTORNEY.

VARIABLE VELOCITY HALFTONE FACSIMILE SYSTEM

INVENTOR,
MAURICE ARTZT.

BY

Harry M. Saragovitz

ATTORNEY.

VARIABLE VELOCITY HALFTONE FACSIMILE SYSTEM

Filed Feb. 26, 1963 6 Sheets-Sheet 3

INVENTOR,
MAURICE ARTZT

BY Harry M. Saragovitz

ATTORNEY

Jan. 11, 1966 M. ARTZT 3,229,033

VARIABLE VELOCITY HALFTONE FACSIMILE SYSTEM

Filed Feb. 26, 1963 6 Sheets-Sheet 4

INVENTOR,
MAURICE ARTZT

BY Harry M. Saragovitz

ATTORNEY

INVENTOR,
MAURICE ARTZT.

BY Harry M. Saragovitz

ATTORNEY.

Jan. 11, 1966 M. ARTZT 3,229,033

VARIABLE VELOCITY HALFTONE FACSIMILE SYSTEM

Filed Feb. 26, 1963 6 Sheets-Sheet 6

INVENTOR,
MAURICE ARTZT.

BY Harry M. Saragovitz

ATTORNEY.

United States Patent Office 3,229,033

Patented Jan. 11, 1966

3,229,033

VARIABLE VELOCITY HALFTONE FACSIMILE SYSTEM

Maurice Artzt, Princeton, N.J., assignor to the United States of America as represented by the Secretary of the Army Filed Feb. 26, 1963, Ser. No. 261,241
12 Claims. (Cl. 178—6)

This invention relates to facsimile systems, and more particularly, to facsimile systems in which variable-velocity scanning is used to permit half-tone-reproduction along with increased speed of transmission.

Facsimile has long been considered as an inefficient means of communication. The bandwidth is many times that required for such systems as teletype, and it is generally used mainly for its ability to transmit graphic or pictorial material. Part of the inefficiency is due to redundancy, in that 35 or 40 "picture elements" are required to form a readable letter as compared to the 5 unit code of teletype. This 7 to 1 loss can hardly be eliminated without also eliminating the ability to transmit graphic material. However, a second loss is also present in that the waste area between bits of information is transmitted at the same area rate as the information area. This loss can be at least partially eliminated by what is known as variable-velocity scanning. Here the information areas would be transmitted at the normal rate and require a bandwidth equal to the normal facsimile system, whereas on waste or white areas the scanning rate would be increased to eliminate part of this wasted time.

One type of copy often transmitted is represented by drawings, weather maps and typewritten messages, which have the general characteristic that information is represented by black lines or marks on a white background (or the reverse). Analysis of this type of copy immediately eliminates practically all forms of coding the "x" coordinate of a black picture element, for it has been found that the average typed message (close typed to eliminate waste area) and weather maps each have an average black area of about 10%.

The systems which do not use coding fall into four general classes:

(1) Two-speed systems in which only black and white are transmitted.

(2) "Black limit" systems in which all scanning is at the high speed or "white" rate, but the scanning spot is momentarily stopped to give a signal "entering black," and again momentarily stopped to give a signal "leaving black".

(3) Multispeed systems in which one or more shades of gray are transmitted at intermediate speeds between the black and white speeds.

(4) True variable velocity systems in which the speed of scanning varies linearly from a minimum for black through all the gray shades up to a maximum for white.

In the above classification the "Black Limit" system becomes the same as the two speed system (1) if each black signal is only one picture element long. As the statistical analysis of typing shows the average black area to be only 1.5 elements long there would be very little speed gain in using (2) in stead of (1). Regardless of which system classification is selected, such as (1) or (2) for example, it is evident that considerable saving in transmission time is possible if the waste areas are scanned at a higher rate. As this invention is primarily concerned with a variable-velocity scanning system wherein reasonably accurate reproduction of all shades of gray are possible as well as black and white, attention will be primarily directed to classification (4).

The true variable-velocity facsimile system (type 4), of all the classifications listed above, can best meet the requirements for reduced transmission time while retaining accurate half-tone rendition. Applicant's patent, No. 2,901,538, issued August 25, 1959, relates to a variable-velocity facsimile system with particular emphasis on the use of a frequency-modulated carrier in which the frequency shift is sufficiently rapid to allow modulating signals to approach the carrier in actual frequency. Reference may be had to that patent for further discussion of the background and general characteristics of such systems.

One limitation of prior FM systems for the transmission of variable-velocity scanning signals is that very little, if any actual speed is gained over a conventional constant velocity system.

It is therefore an object of this invention to provide an improved variable-velocity scanning system for facsimile transmission.

It s a further object of this invention to provide a variable-velocity facsimile system using an FM subcarrier signal.

It is an additional object of this invention to provide an improved detection circuit for the FM subcarrier of a variable-velocity facsimile system.

A still further object is to provide an improved variable-velocity facsimile system which is capable of transmission of all gray shades from black to white along with improved transmission speed.

As the ratio of white scanning velocity to black scanning velocity is increased, the accuracy of arrival time of transient wave fronts becomes increasingly important and the allowable delay distortion becomes less. This one factor, more than any other, places the final limit on how much faster white may be scanned, and therefore it must be the first consideration in determining the parameters of any system.

In the development of this system "time" has been considered as broken up into small "bits," and "breathing" time allowed between these bits in order to obtain signals that are more tolerant of delay distortion and at the same time will not appreciably affect the accuracy of timing required to hold the recorder in satisfactory synchronism with the scanner. This method of breaking up time permits the ratio of white to black speed to be about 3 to 1 for the FM system when meeting the same bandwidth and delay distortion requirements established for the constant speed facsimile transmission at the black speed. A greater speed ratio than this would exceed the bandwidth allowance or require tighter delay equalization of the telephone line used for transmission, or both.

The bandwidth required for constant speed facsimile is determined by the rise time of the transient signal produced in going from white to black or black to white. If each transition is considered as one half cycle of the video signal, then the maximum video frequency (sometimes called keying frequency) will be the number of picture elements scanned per second divided by 2. When the scanning velocity is increased for white as compared to black, the average velocity of scanning over a white to black or black to white transition will be somewhere between the black and white scanning velocities, and the bandwidth will therefore increase.

This point has been overlooked in some of the proposals for variable-velocity facsimile. The mistake usually made is in assuming all black areas will be transmitted at the black or low scanning rate and all white areas at some rate sufficiently high to practically eliminate them as far as wasted time is concerned. Such thinking leads to statements that a page containing 10% black area has a theoretically possible speed increase approaching 10 to 1, a 5% black area 20 to 1, etc.

These figures can be true only if the white speed is very much higher than the black rate, and if no transitions are involved. When the bandwidth is held to the same maximum value required for constant speed scanning at the black rate then all transitions must also be at the black rate. An isolated black picture element thus requires a whole cycle of the maximum video frequency for transmission instead of one half cycle. On this basis, and still considering the white speed as very much greater than the black, a 10% information content message could have a theoretically possible speed increase of only 5 to 1 if all black areas were single isolated picture elements, and a somewhat higher ratio than this where the average black area is more than one element in length. For a typed message where the average black area is 1.5 elements, the theoretical speed increase approaches 6 to 1 as the white speed approaches infinity.

These theoretical speed gains are possible while remaining within the black speed bandwidth only if the effects of delay distortion are not considered. It is now customary to allow a maximum delay error of not over ±90° of the maximum video frequency over the video band. This can amount to a misplacement of an isolated black element by not more than 0.5 element from its true position. With this limit, a 600 cycle video frequency requires delay equalization to within ±0.416 millisecond, and a 1200 cycle video frequency line equalization to within ±0.208 millisecond. The latter limit is now common for most facsimile lines.

The delay tolerances for a variable velocity system are not so readily apparent. Consider a two speed black and white system in which the black-white or on-off signal is transmitted as on-off D.C. without a carrier, and consider also that the scanning spot enters and leaves black at the black or slow rate thus confining the bandwidth to the desired limits. The rise and decay for "on" and "off" will then each have a wave front equivalent to one half cycle of the video frequency. Under these idealized conditions it is possible to set separate positive going and negative ging threshold values to correct for delay distortion (within reasonable limits) and maintain accurate synchronism of recorder to scanner. The chief requirement for this form of delay correction is that once the signal has crossed either of these thresholds at which the speed is suddenly changed, no part of the remainder of this transient wave may re-cross the threshold value in the opposite direction. With a 50% threshold for speed change, this means that once the signal rises above 50% value it must stay above this value until a signal of the opposite polarity drives it below the 50% level and that any secondary peak or bounce must be lower than 50% until another "on" signal arrives. These conditions will normally be met if the delay tolerances are within the usual limits of the constant speed system.

If all positive going and negative going transients were equal and complementary, delay tolerance would not depend on the ratio of white to black velocities. As long as these on and off transitions are scanned at the slow rate almost any white speed is theoretically possible. However, some practical limitations are imposed, and for the on-off system these limits occur where the white speed is about four times that for black. Chief of these is that delay correction by using separate positive and negative thresholds as outlined in the preceding paragraph cannot be made perfect in the restricted bandwidth allowed. If the on-off D.C. signal has no components above the maximum video frequency, the shorter isolated black signals (from one to less than two elements long) will be a little narrower than they should be at the threshold settings, so the actual average speed will be slightly high because of the increased percentage of white signal. Where the black signals are two elements long but less than three, a second harmonic allows better formation of the signal, so the timing is better. In this case it may at times be greater than the true value. For time widths greater than three elements long both second and third harmonics allow almost perfect signal formation. An average of delay errors obtained by this threshold correction shows that the accumulated error for one scanning line will probably be within one or at the most two elements if the white speed is not greater than four times the black speed.

For transmission over a telephone line an on-off D.C. signal can not be used and some form of AM or FM modulated subcarrier is required. When a 600 cycle modulation is put on a 2400 cycle AM carrier for line transmission, only 4 cycles of carrier are allowed for one cycle of video information. The detected signal information would therefore be less accurate than the original modulating signal, and synchronizing errors could become more troublesome. For this reason the "step-synchronizing" system is generally suitable for black and white signals only.

The continuously variable system in one form of this invention is in reality a step system with the time width of the steps continuously variable, and its tolerance to delay errors is somewhat similar to that of the black and white step method, for the reasons which follow.

An FM subcarrier is used for line transmission, and in a particular case the end frequencies are 2400 cycles for black and 1800 cycles for white. Detection is obtained by using two limiters to obtain two signals of square wave form and with sharply defined 0° and 180° zero crossing points. One of these signals is derived directly from the FM signal wave without phase shift. The second is obtained by passing the FM signal through a phase shift network before limiting. This network is designed to have a small phase shift for the 1800 cycle white frequency and a large phase shift for the 2400 cycle black frequency. When the outputs of the two limiters are algebraically added and then full wave rectified, a series of pulses is obtained that vary in time width according to the shade of the picture. These pulses will be "on" for about 75% of each half cycle when white signals are obtained, and they will be "on" for about 25% of each half cycle of the FM wave for black signals.

The "on" portion of these pulses is used to turn on a free-running sawtooth generator and thus linearly move the scanning spot only while pulses are being received. The spot thus moves in spurts and is not moved during the "off" time between pulses. As all the required information is contained in the timing of the crossovers in the limited FM wave, any distortion that does not change the number of crossovers will theoretically average out so that the sum of two adjacent pulses will be correct in time. If the first is made too short due to noise or phase shift, the next will be too long by the same differential error. The tendency is therefore towards averaging errors to zero rather than accumulating them to extend or shorten the scanning line.

A more detailed description of the invention will now be given in connection with the accompanying drawings in which.

Figure 6:
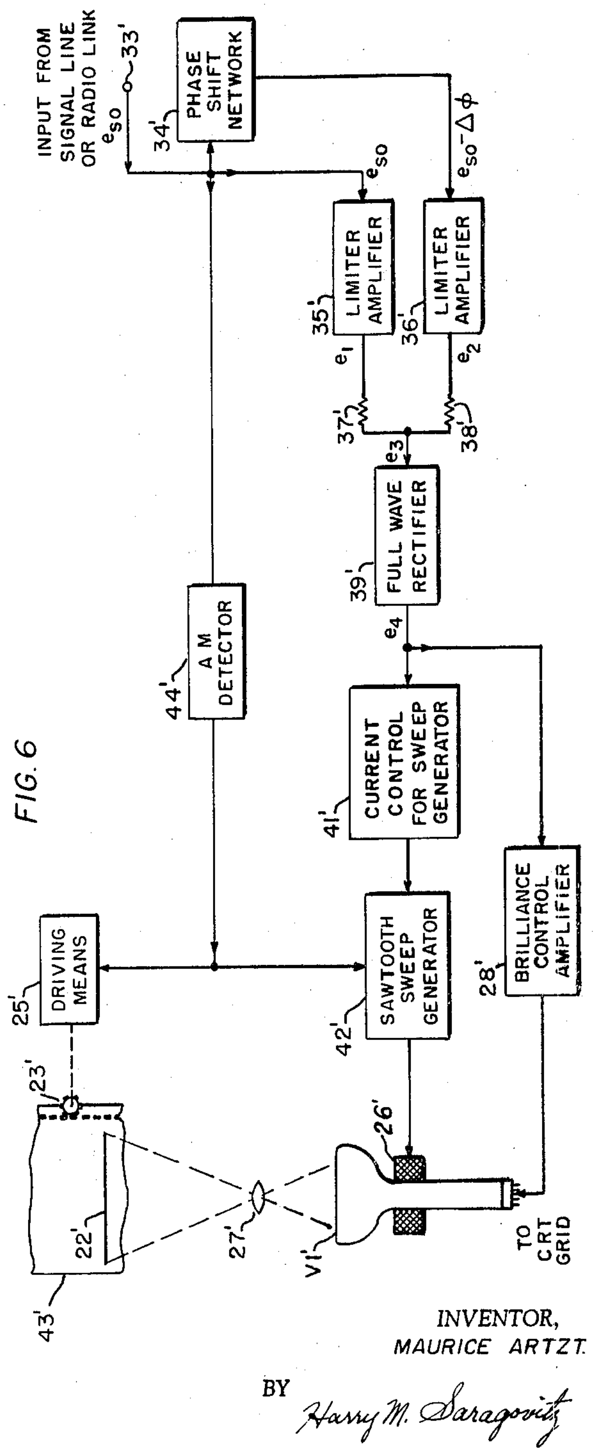
Figure 8:
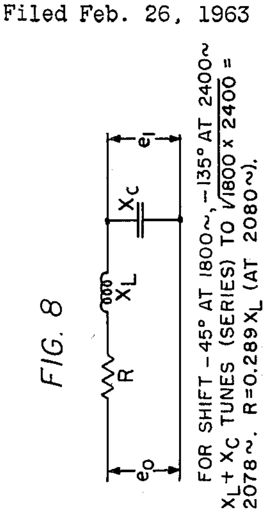
Figure 10:
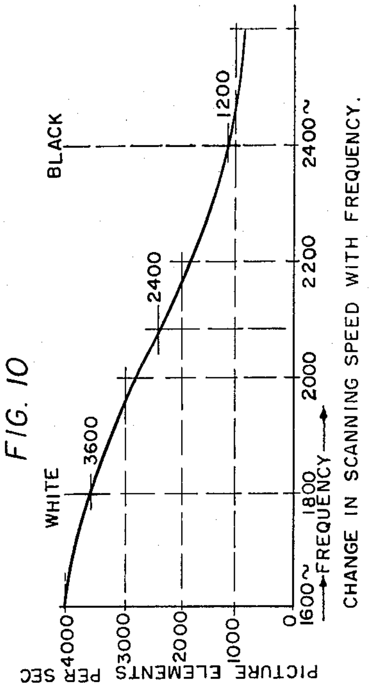
Figure 7:
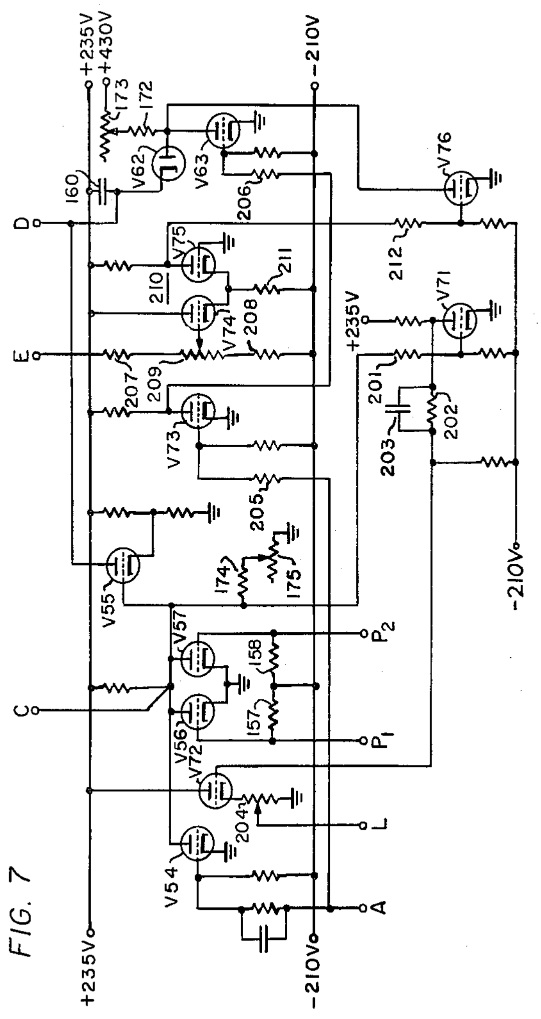
Figure 9:
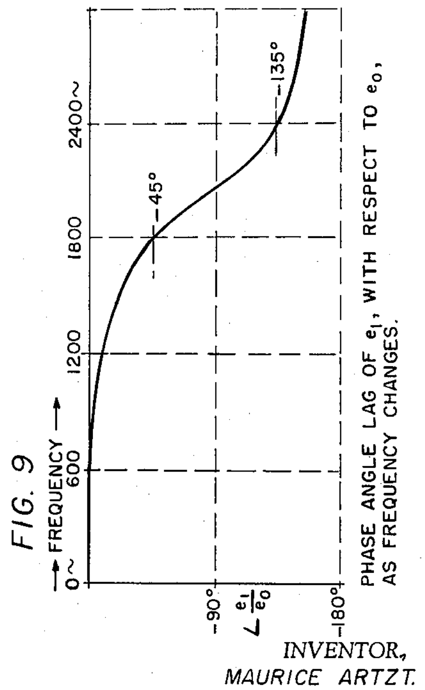
Figure 11:
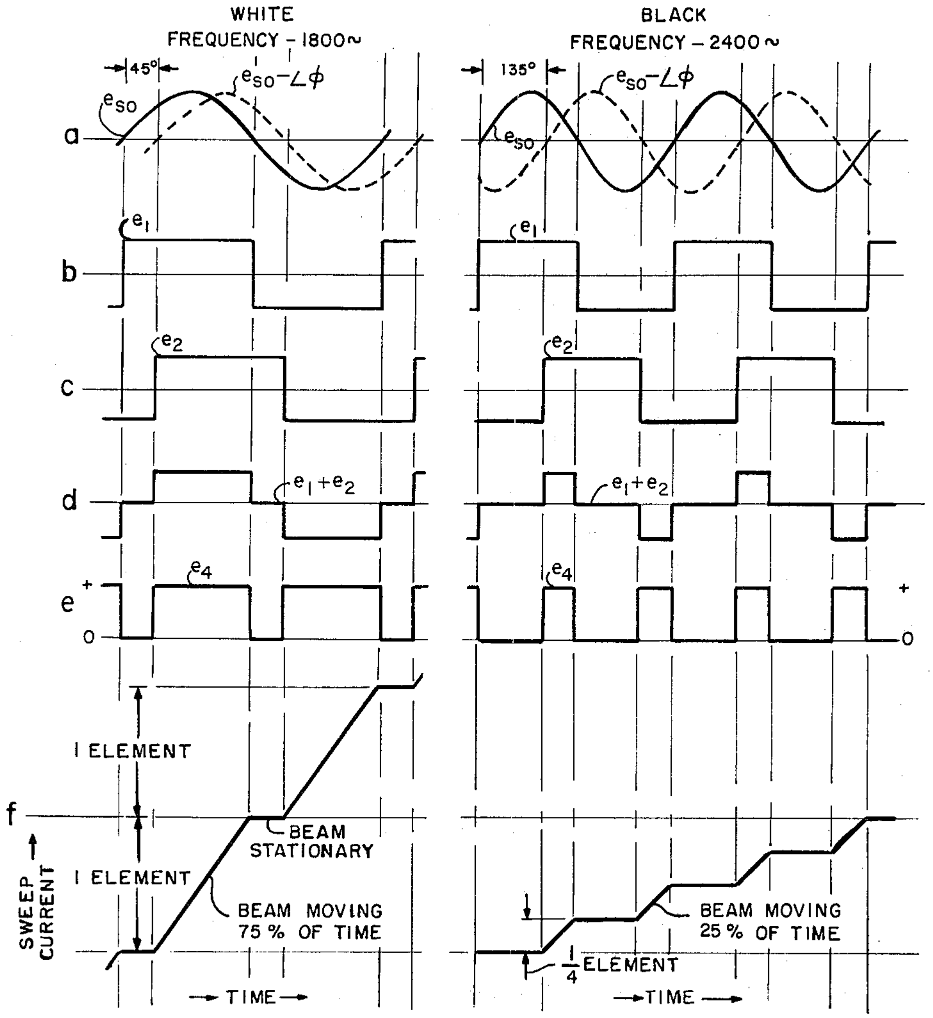

FIGS. *5a* and *5b* together are a schematic diagram of the scanner phase detector, sweep generator and yoke drive amplifier;

FIG. 6 is a block diagram of the recorder portion of the system;

FIG. 7 is a schematic diagram of a portion of the recorder circuit;

FIG. 8 shows the phase shift network of the system;

FIG. 9 represents a graph of the change in phase angle with respect to frequency for the circuit of FIG. 7;

FIG. 10 is a graph of the change in scanning speed with frequency;

FIG. 11 represents a series of waveforms showing the generation of variable velocity sweep from the phase shift of the FM carrier.

Figure 1:
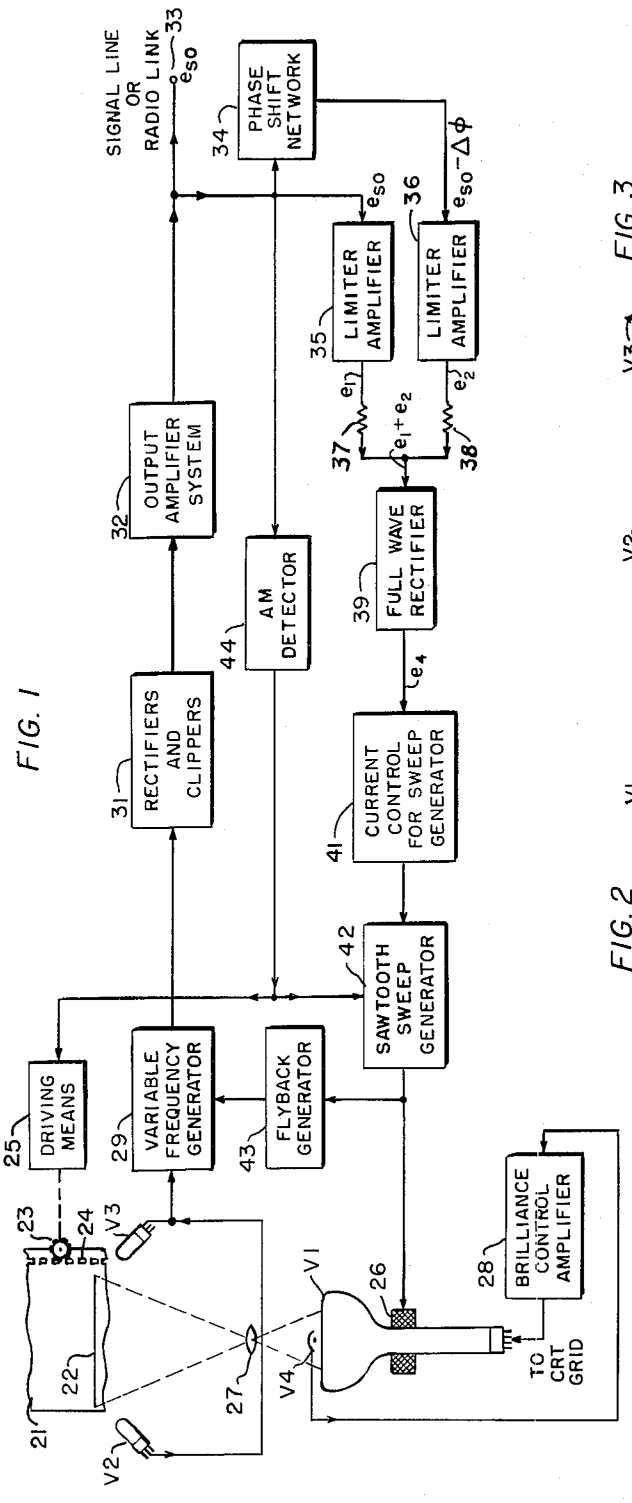
FIG. 1 represents a block diagram of a scanner in accordance with the invention.

Referring now to the drawings in detail, FIG. 1 outlines the portion of the system for generating and transmitting the variable velocity signals in accordance with the invention. The subject matter to be transmitted to a remote point is shown at 21 as being carried past a scanning zone 22 in the conventional manner by a belt or drum driven by sprocket 23 engaging holes 24 in the drum. Driving means 25, which may be a ratchet motor, for example, moves the drum synchronously with the scanning as will presently be explained.

The scanning area is illuminated by a flying-spot cathode-ray tube $V_1$ which produces an intense spot of light on the face of the tube. Yoke coil 26 sweeps the spot into a line across the face of the tube; this line is projected through lens 27 onto scanning area 22. Light reflected from the scanned subject matter is picked-up by photocells V2 and V3, which may be conventional photomultipliers. These tubes, which are connected in parallel for signal output, are arranged near either end of the scanned line 22 to provide a relatively uniform elecrtical response to the illumination. Photocell V4 is mounted near the face of scanner tube V1 to sense its total light output. The signal from this tube is amplified by brilliance control amplifier 28 to provide control voltage at the grid of scanning tube V1 to maintain a uniform spot intensity.

The signal from phototubes V2 and V3 is amplified and changed into a frequency-modulated sawtooth wave by variable frequency sawtooth generator 29. This is coupled through rectifiers and clippers 31 and amplified by 32 for transmission by direct wire or radio from output 33. A portion of the output signal $e_{so}$ is tapped off for controlling the sweep system. Part of this signal is routed through phase shift network 34 to provide a signal $e_{so}-\Delta\theta$. These two signals then pass through similar limiter-amplifier systems 35 and 36 to produce respective voltages $e_1$ and $e_2$. These are combined in resistive adder 37 and 38 to produce a signal $e_3$. This is rectified by 39, providing a control voltage $e_4$ which, in turn, is used to actuate current control circuit 41 for sweep generator 42. The sweep generator output controls the current flowing through the yoke coil; it also actuates flyback generator 43. The flyback pulse appears in the output of generator 29 while causing the FM signal to cease during the duration of the flyback pulse. AM detector 44 which has its input connected to output terminal 33, detects the flyback pulse and controls driving means 25. The output from detector 44 also synchronizes the sawtooth generator.

Figure 3:
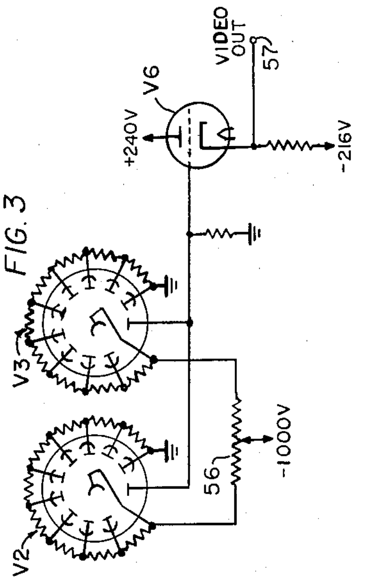
FIG. 3 is a schematic diagram of the photocell video pickup circuit.
Figure 2:
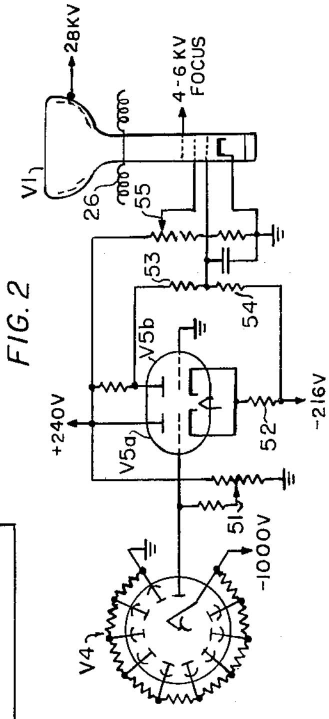
FIG. 2 is a schematic diagram of the scanner kinescope brightness control circuit.
Figure 4:
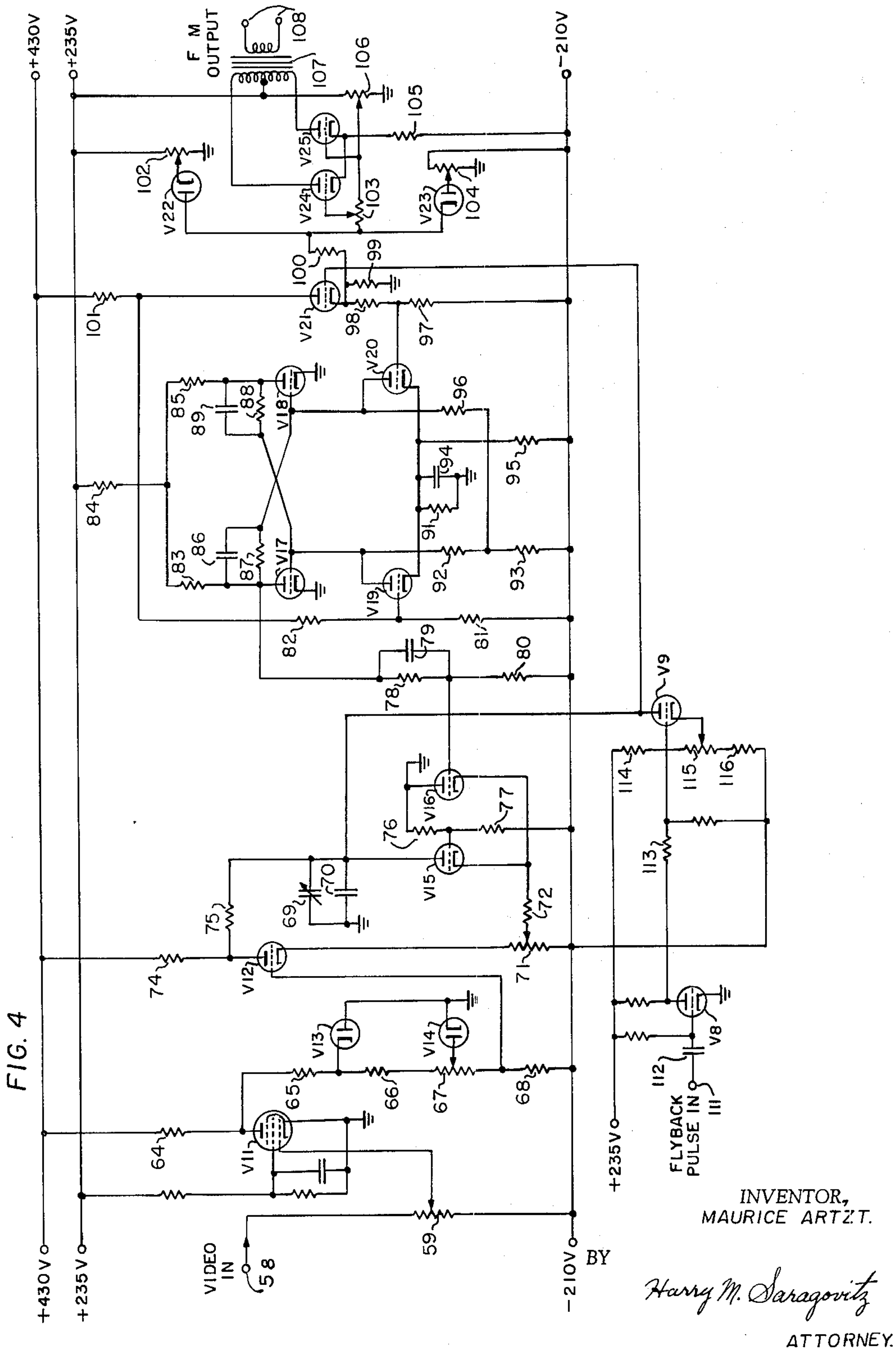
FIG. 4 is a schematic diagram of the FM signal generator.

The scanning system will now be considered in more detail with reference to FIGS. 2, 3 and 4. FIG. 2 is a schematic diagram of the photocell and kinescope circuits of the scanner. Photomultiplier V4 is located in a position to pick up the light of the scanning spot directly from the face of flying-spot tube V1. V4 converts this to an electrical signal proportional to the light output. V5 is a cathode follower providing a high input impedance for this signal. Potentiometer 51 sets the bias level for V5 and output electrode of V4, and ultimately the light intensity from V1. The signal is coupled from V5*a* to V5*b* by the common cathode resistor 52, and from the plate of V5*b* to the control grid of V1 through voltage divider 53 and 54 which provides the proper bias level for the control grid of V1 while maintaining a D.C. coupling throughout. Control 55 sets the operating level for the second grid of V1. The circuit of FIG. 2 serves to automatically maintain a constant light output from V1 to insure uniform scanning illumination.

FIG. 3 is a schematic diagram of circuit for photomultiplier tubes V2 and V3 which pick up the light reflected from the material as it is scanned, with one tube arranged near each end of the scanning line for uniformity of electrical signal output. V2 and V3 are connected in parallel for signal output to V6, which is a cathode follower for low output impedance. Control 56 permits electrical balance of the characteristics of tubes V2 and V3.

Output 57 of the circuit of FIG. 3 is fed to input 58 of FIG. 4, showing the scanner phototube amplifier and FM generator 29. The signal voltage at input 58 varies from 2 volts for white to 4 volts for black. Gain of amplifier V11 is set by photentiometer 59. The output voltage across plate resistor 64 is distributed by series resistor network 65, 66, 67 and 68, which also determines the operating voltages for clippers V13 and V14. Voltage from this network is applied to the grid of V12 which charges capacitors 69 and 70 in the positive direction through resistor 75. This voltage is coupled to the grid of V21, and when the level of 10 volts positive is reached V21 causes the bistable multivibrator consisting of V17 and V18 to turn over, since the signal developed across plate resistor 101 of V21 is coupled through resistor 82 to the grid of control tube V19, while the signal appearing at the junction of cathode resistors 97 and 98 is coupled to the grid of control tube V20, enabling the multivibrator to be triggered in either direction by signals of the proper polarity. The plates of tubes V17 and V18 are fed from the positive supply through resistors 84, 83 and 85. Respective coupling networks 86, 87 and 88, 89 cross-couple the multivibrator. Resistors 92, 93 and 96 set the proper operating voltage levels for the grids of V17 and V18 and the plates of V19 and V20. Cathode resistors 91 and 95 set the operating bias for V19 and V20. Capacitor 94 provides an A.C. shunt for the cathode circuit.

The pulse voltage from the plate of V17 is coupled to the grid of V16 through network 78 and 79. Resistor 80, along with resistor 78, sets the bias for V16, which is a cathode follower driving V15 through the common cathode connection. The cathodes are coupled through resistor 72 and potentiometer 71 to the cathode circuit of V12. Resistors 76 and 77 set the bias for V15.

The pulse from the plate of V17 through V16 causes V15 to conduct, starting the capacitors 69 and 70 to charge in the negative direction at the same rate as before, and this continues until −10 volts is reached. At this point V21 again trips the bistable multivibrator V17 and V18 to its original polarity, starting the positive charging of 69 and 70 again. A constant (±) amplitude symmetrical triangular wave is thus generated that requires only a small clipping of the peaks to be near enough to a sine wave for the purposes of this invention.

The frequency of this wave is determined by the positive and negative voltages of the plate and cathode of V12, and these voltages, in turn, are controlled by the phototube signal through V11. Capacitor 69 is variable to set the 2400 cycle limit of this circuit.

Diodes V22 and V23, corresponding to block 31 of FIG. 1, are positive and negative clippers, respectively, for limiting the voltage appearing at the cathode of V21, as coupled through resistor 100. The signal corresponds to that on capacitors 69 and 70, which are connected to the grid of V21. Potentiometers 102 and 104 set the clipping levels. The clipped signal is applied to the grid of V24 through potentiometer 103 which controls the gain of the output circuit. Potentiometer 106 sets the D.C. balance for tubes V24 and V25, which feed output transformer 107 in push-pull by virtue of the common cathode connection and resistor 105. This stage corresponds to block 32 of FIG. 1. The output from terminals 108 is fed to a signal line, or to a radio link, for transmission to a facsimile receiver at some distant point.

This output signal is also fed to the scanner circuit of FIG. 5, as will be more fully explained below.

Figure 5A:
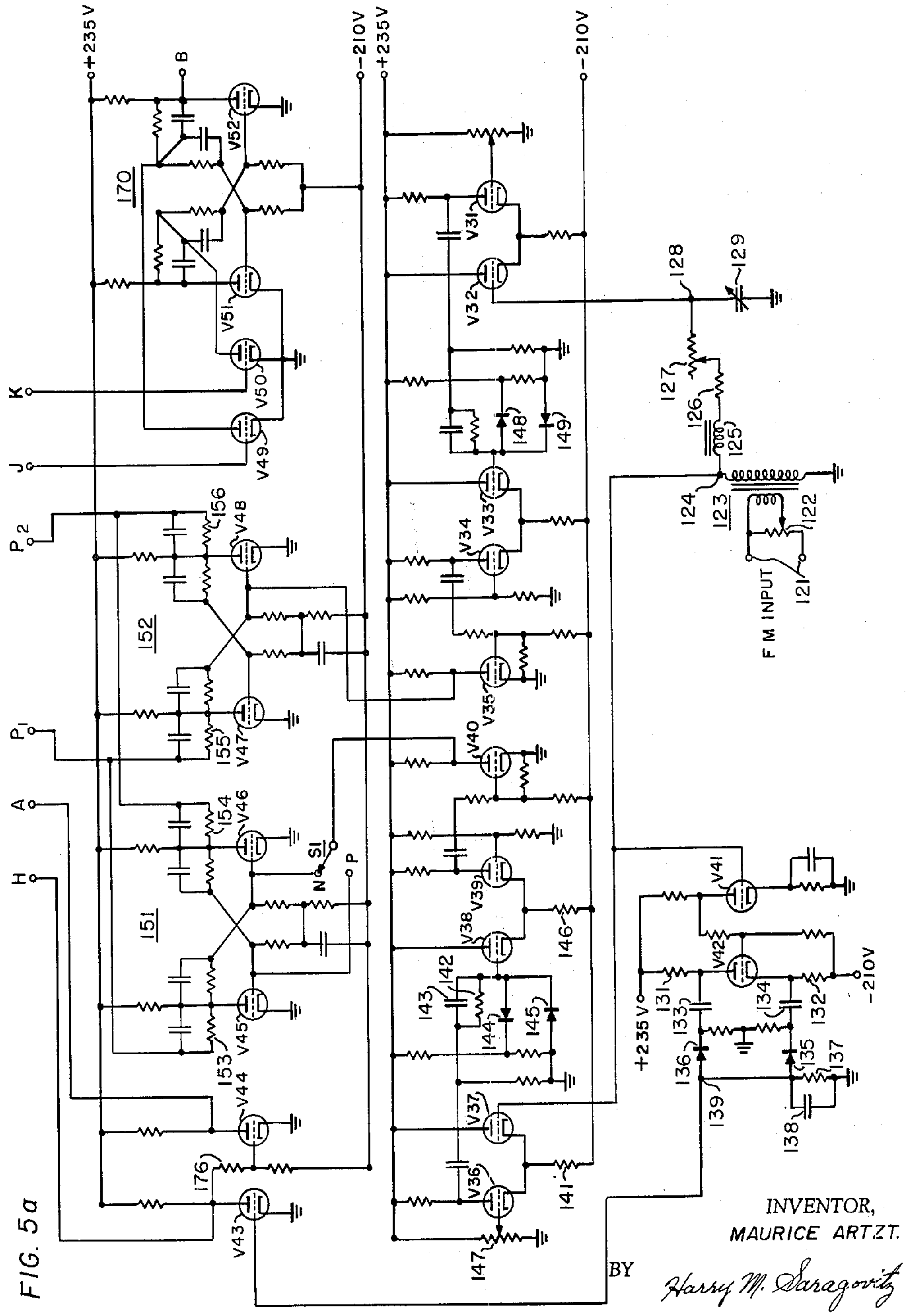
Figure 5B:
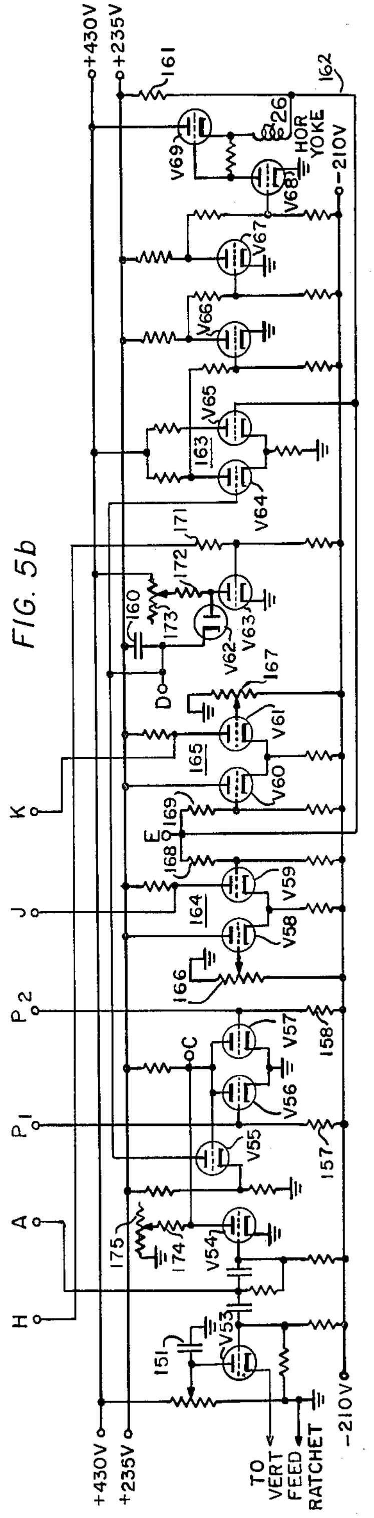

The flyback pulse, the origin of which will be discussed in connection with FIGS. 5a and 5b, is fed to input 111 where it is coupled through capacitor 112 to the grid of tube V8. The plate of a tube V9 is coupled to the ungrounded terminals of capacitors 69 and 70 and its cathode connected to the tap of a potentiometer 115. Resistors 114 and 116 and potentiometer 115 set the bias level for tube V9. The plate of V8 is coupled to the grid of V9 by a resistor 113. While flyback of the scanner is in progress, V9 acts to cut the FM signal to zero, that is, the AM flyback signal is a squelch of the FM signal.

FIGS. 5a and 5b together are the schematic diagram of the phase detector, sweep generator, yoke drive amplifier and flyback circuits of the scanner system, corresponding to blocks 34 to 39, 41 and 42 to 44 of FIG. 1. Points H, A, $P_1$, $P_2$, J and K of FIG. 5a are connected to corresponding points in FIG. 5b. The lower portion of FIG. 5a represents the input system in which signals from terminals 108 of FIG. 4 are applied to terminals 121.

Potentiometer 122 sets the signal level applied to transformer 123. The output from terminal 124 of the secondary is fed to three paths, the first of which is through amplifier V41 to split load amplifier V42. The signals developed across equal load resistors 131 and 132 are coupled through capacitors 133 and 134 to diodes 135 and 136 which with time-constant network 137 and 138, serve as an amplitude detector to separate the flyback or phasing signal from the FM signals carrying the picture information. This detector corresponds to block 44 of FIG. 1. Since the AM flyback signal is a squelch of the FM signal, the voltage at AM detector output terminal 139 changes from a negative value during scanning to zero during the flyback period.

A second path from terminal 124 of the input circuit is that to cathode follower V37 of the balanced differential limiting amplifier pair V36 and V37, which are coupled through common cathode resistor 141. This signal path, which is represented by block 35 of FIG. 1, serves as a limiter for the FM signal from terminal 124. The output from the plate of V36 is coupled through parallel network 142 and 143 to V38 of a second differential limiter amplifier pair V38 and V39, which are coupled through common cathode resistor 146. Because of these two pairs of amplifier stages, V36–V37 and V38–V39, both positive-going and negative-going signals are limited equally. Potentiometer 147 adjusts the 180° symmetry balance. Additional limiting is provided by diodes 144 and 145 in the coupling network between V36 and V38. V40 amplifies the signal for succeeding circuits.

The third signal path from terminal 124 is through a phase-shifting network including choke 125, resistors 126 and 127, and capacitor 129, included in block 34 of FIG. 1. Resistor 127 and capacitor 129 are adjustable, the latter to set the phase shift of the delayed FM signal relative to the FM signal routed through limiter stages V36–V39.

The output signal from terminal 128 of the phase-shift network is routed through a limiter system 36 of FIG. 1, consisting of tubes V31–V35 and diodes 148, 149 of FIG. 5a. Because this limiter is substantially identical to the limiter circuit including V36–V40 for the undelayed FM signal discussed above, this circuit will not be described in detail.

Before proceeding further with the detailed description of FIG. 5, the derivation of the phase-shift network, and the action of the phase detector system of which it is a part, will be discussed in connection with FIGS. 8–11. The phase-shift network 125–129 of FIG. 5a is shown in simplified form in FIG. 8. This is basically an unterminated half section of low pass filter in which L and C tune to the mean frequency of the 1800 to 2400 cycle swing (2077.8 cycles), as shown in FIG. 9. The phase shift is 90° at this mean frequency, and symmetrical above or below this for any two frequencies whose product is $(2077.8)^2$. The value of resistance R in the network can be made such that this ± angle from −90° is made any value desired up to near 90°. With R chosen as 28.9% of the value of $X_L$ (at 2077.8 cycles) the angles become −45° and −135° at 1800 and 2400 cycles respectively.

With this particular network the plot in FIG. 10 shows the actual speed of scanning in elements per second over a wide range of frequencies. The curve is asmyptotic of 4800 elements per second at the low frequencies, half this rate or 2400 elements per second at the mean frequency of 2077.8 cycles and would reach zero at infinite frequency.

There are many other types of networks that could be be used, some more linear than others, but this one is preferred because of its simplicity and the fact that it has a very small change in phase angle with drift in component constants. The angular delay of both scanner and recorder networks must agree very closely over the frequency band, so low temperature coefficient constants are necessary.

One possible FM scanning speed control system requires a frequency swing ratio exactly equal to the speed ratio between white and black, using jump-scanning of one element per half-cycle of carrier. While this system requires no stable circuit components, and can cover the full half-tone range, unfortunately it has an increase in bandwidth almost directly proportional to the speed increase, and so has no practical advantage over the simple expedient of driving a constant velocity system at a higher speed.

By the use of the detector system of this invention, however, virtually the same high speed ratio can be obtained without using the same frequency swing ratio. It is perfectly feasible to obtain a 3 or 4:1 detector output ratio with a greatly restricted frequency swing. The chief problem is the accuracy required of the detector system in maintaining a definite output for a definite frequency, and duplicating this output each time that particular frequency is transmitted. The "phase-shift" detector system of this invention is utilized to fulfill this condition.

With this form of detector an output is obtained that is of the variable pulse width type, so a stop-go scanning may be employed that has only one accurate speed of travel. It is simply turned on for a longer portion of each half cycle of carrier for higher average scanning speeds and off for the greater portion of each half cycle for the lower scanning speeds.

The action of the detector system is shown in FIG. 11. The network of FIG. 8 has a small angular phase delay of the FM wave at the lowest frequency of its swing, and a large angular phase delay at the highest frequency of the swing. This delayed wave is added directly to the original wave to give nearly in-phase addition for a high amplitude at the low frequencies, and nearly out of phase addition for a low amplitude at the high frequency end of the swing. When used in this manner a straight amplitude detection results. However, the original and delayed waves are each put through the separate limiters to obtain square waves as in line *b* and *c* of FIG. 11, and then added to give waves such as shown in line *d* of FIG. 11. When this sum of the two square waves is full-wave rectified a variable width on-off pulse results, line 4, that has, in this case, 135° "on" and 45° "off" for each half cycle of 1800 cycles, and 135° "off" and 45° "on" for each half cycle of 2400 cycles. In this case then, under steady state conditions, the "on" time is 75% of the total for continuous 1800 cycles for white, and the "on" time is 25% of the total time for continuous 2400 cycles for black. This gives a 3 to 1 ratio in "on" time for white as compared to black.

In line *f* of FIG. 11, the appearance of the scanning yoke current is shown for these conditions. The yoke current increases linearly at a constant rate for the duration of each "on" pulse, and is stopped for the "off" portion of each half cycle of carrier. The rate of change of yoke current is made such that the black scanning speed will be at the rate of 1200 elements per second for an equivalent keying frequency of 600 cycles for $f_k$. One element thus requires 4 half-cycles of time at the black frequency at 2400 cycles or four "on" pulses, and each black "on" pulse moves the spot 1/4 of a picture element. The "on" time of each half cycle of 1800 cycles is four times as long as those for black, so one full element is scanned for each half cycle of white. The average white speed is thus three times the average black speed.

Returning now to FIG. 5*a*, tube V43 has been held at cutoff bias or below during scanning due to the negative voltage developed at point 139. Tube V43 assumes a condition of full plate current during the flyback signal, delivering a negative pulse at its output terminal H. The plate of tube V43 is coupled to the grid of tube V44 by a resistor 176. The negative flyback pulse appearing at the plate of tube V43 causes a postive pulse to appear at terminal A, the output of tube V44. The plate of tube V44 is coupled to the grid of tube V53 which discharges capacitor 151 into the relay coil of the scanning ratchet motor for advancing the paper feed drum during the flyback period. As the scanning occurs irregularly in time, the ratchet feed of one line per flyback signal is required.

To obtain very square pulses and to obtain effectively a full wave rectification of the sum of the signals from the limiter paths, the outputs from the limiter circuits are fed to multivibrators 151 and 152 comprising tubes V45 and V46 and tubes V47 and V48 respectively. The outputs of tubes V45 and V47 are applied through resistors 153 and 155 and are added across resistor 157. The outputs of tubes V46 and V48 are applied to resistor 158 through resistors 154 and 156. The voltage at the plate of V46 is shown in line *b* of FIG. 11 while the voltage appearing at the plate of V48 is shown in line *c* of FIG. 11. The voltage appearing across resistor 158 is shown in line *d* of FIG. 11. Since the condition of conduction of tube V45 is opposite that of V46, and the condition of conduction of tube V47 is opposite that of V48, the signal across resistor 157 is 180 degrees out of phase with respect to that across resistor 158. The voltages across resistors 157 and 158 are applied to the grids of tubes V56 and V57 respectively, which are so biased that the voltage waveform shown in line *e* of FIG. 11 appears at point C, the common connection of the plates of V56 and V57. The common plate circuit of tubes V56 and V57 therefore becomes the full wave pulse output for controlling the charging capacitor. In FIG. 1 this signal appears in the output of block 39 and is designated $e4$. As was previously mentioned, a series of positive pulses, whose widths are inversely proportional to the amount of black contained in the scanned subject matter, appear at point C. These pulses cause tube V55 to conduct and thereby charge capacitor 160 which is connected between the plate of V55 and the +235 v. line.

The voltage wave which controls the current wave in the yoke is derived by turning "on" and "off" a regulated current to charge capacitor 160. While "on" the voltage across the capacitor rises at a fixed rate, for example, 240 volts per second. Each pulse from the phase detector system turns on this charge current during the "on" portion of its cycle, and the charge current is turned off during the "off" portion of each pulse cycle. The charging current is metered and held to a constant value as will be hereinafter described.

The rate of charging capacitor 160 is determined by the maximum plate voltage allowed on tubes V56 and V57 which is dtermined by the total resistance provided by a fixed resistor 174 and a variable resistor 175 which are connected between point C and ground. During the flyback period the positive flyback pulse appearing at point A is inverted by tube V54, causing tube V55 to become cut-off as the plate of tube V54 is coupled to the grid of tube V55. This allows complete retrace of the voltage across capacitor 160 to the full value at which it triggers the start-scan system of the scanner which will be more fully described hereinbelow.

The voltage across capacitor 160 is coupled to the grid of tube V64 of a differential comparison amplifier 163. The output from the plate of V64 is greatly amplified by two D.C. connected stages comprising tubes V66 and V67. The amplified signal appearing at the plate of V67 is coupled to the grid of tube V68 of the yoke drive amplifier which comprises tubes V68 and V69 connected as a one over one balanced D.C. amplifier having a D.C. center line of output connected to the yoke 26 at the +235 v. level. The yoke coils are formed of a large number of turns of small wire so the D.C. current for the slow speed sweep rates will be low. Yoke current is measured by the voltage drop across a resistor 161 connected in series with the yoke. This voltage drop is connected by way of line 162 to the grid of V65 of differential amplifier 163 which compares the yoke resistor current to the sawtooth voltage wave at point D and forces the yoke current to match this voltage at all points along the sweep. Due to the high gain amplifier and driver stages within this feedback loop, the actual yoke current is sufficiently accurate to produce highest quality pictures.

The flyback signal is generated in the scanner by putting positive and negative limits on the yoke current due to the operation of differential amplifiers 164 and 165 which comprise tubes V58 and V59 and tubes V60 and V61 respectively. The grid of tube V58 is connected to the movable tap of potentiometer 166 while the grid of tube V61 is connected to the tap of potentiometer 167. The grids of tubes V59 and V60 are connected through resistors 168 and 169, respectively, to point E which is connected to line 162. The positive and negative limits on the yoke current are seprately controlled by potentiometers 166 and 167 so that the scanning line always operates between preset limits.

Multivibrator 170, which comprises tubes V51 and V52, is triggered into one position for scanning and the other for flyback. Amplifiers V49 and V50 trigger multivibrator 170 in response to the output voltages of differential amplifiers 164 and 165 as the plates of tubes V59 and V61 are connected to the grids of tubes V49 and V50, respectively. The flyback pulse is coupled from the plate of tube V52 to terminal B which connects to terminal 111 of FIG. 4.

The sharpened negative flyback pulse appearing at the plate of tube V43 is coupled through resistor 171 to the grid of tube V63 which ceases to conduct during the flyback period. Capacitor 160 then discharges through diode V62 and resistors 172 and 173. The flyback time is adjustable by setting the time constant of the discharge circuit of the sawtooth capacitor 160 by adjusting resistor 173.

The input circuit of multivibrator 151 contains a switch S1 which has a movable contact that can connect the plate circuit of tube V40 to either of fixed contacts N or P. The circuit normally operates with the movable contact at point N as shown, and the previous description was based on this condition. If, however, more than half of the scanned subject matter is black, faster scanning will be obtained if the movable contact of switch S1 is moved to position P, since this will cause the pulses appearing at point C to be wider for black than for white.

The receiving system used in the recorder for reproducing the transmitted material is outline in FIG. 6. Because this is basically similar to the scanner system of FIG. 1, corresponding parts have similar reference characters primed. Input signal voltage $e_{s0}$ at 33′ from the signal line is transmitted directly through limiter and amplifier 35′ to branch 37′ of the resistive adder, and another portion of the input voltage is coupled through phase-shift network 34′ and limiter-amplifier 36′ to the other branch 38′ of the resistive adder. The combined signal voltage $e_3$ passes through rectifier 39' to the current control circuit 41' for sawtooth sweep generator 42' which drives horizontal yoke coil 26'. This sweeps the spot of cathode-ray tube V1' across the tube face. This light is transmitted through lens 27' to scan a line 22' on photosensitive material 43'.

The input signal from line 33' is also coupled to AM detector 44' which detects the flyback pulse. The output from detector 44' synchronizes the ratchet drive motor 25' with the horizontal sweep circuit of $V_1$ to cause sprocket 23' to move photosensitive material 43' the width of one line as each line is scanned. The flyback pulse from detector 44' also synchronizes the sweep of sawtooth sweep generator 42'.

The recorder circuit of FIG. 6 differs for the scanner of FIG. 1 in several respects, the principal distinctions being in the sawtooth generator circuits and in the control of the brilliance of the spot of cathode ray tube V1. Since the illumination produced by this tube must vary in accordance with the incoming signal, the control voltage for billiance control amplifier 28' is taken from rectifier 39'.

The recorder phase detector, sweep generator and yoke drive amplifier are almost identical to those used in the scanner of FIGS. *5a* and *5b*. The modifications to be made to these circuits for use in the recorder are shown in FIG. 7. The main differences between FIG. 7 and FIGS. *5a* and *5b* are: (1) a one tube amplifier is added to turn the recording cathode ray tube beam off and on according to the off and on times of the scanning control pulses, and (2) the flyback timing circuits have been changed to enable the recorder to exactly follow the scanner.

To control the cathode ray tube beam the pulse output at point C is coupled through resistor 201 to the grid of tube V71 where the polarity of the pulses is reversed. The output of V71 is fed through a parallel network comprising resistor 202 and capacitor 203 to the grid of a cathode follower V72. An output potentiometer 204, which is connected to the cathode of tube V72, sets the positive level of the cathode ray tube grid for the "on" condition. Tube V72 is biased to cutoff for the beam "off" condition.

The flyback system of the recorder has no timing circuit but follows the flyback signal generated by the scanner. The detected flyback pulse which appears at point A is of positive polarity. This pulse is coupled through resistor 205 to tube V73 which reverses its polarity. Tube V73 also provides additional amplification in the recorder to help override any noise on the recorder signal that is not present at the scanner. The output of tube V73 is coupled through resistor 206 to the grid of tube V63 which is biased to cutoff by the negative pulse. This starts the discharge of sawtooth capacitor 160 through diode V62 and resistors 172 and 173 to the +430 v. line. Point E, which was described with respect to FIG. *5b* as being at a potential that is proportional to the current flowing in yoke coil 26, is connected through resistors 207 and 208 and potentiometer 209 to the —210 v. line. The grid of tube V74 is coupled to the tap of potentiometer 209. Tube V74 and tube V75, whose grid is grounded, form a differential amplifier 210, the common cathode connection of which is connected to the —210 v. line through resistor 211. The plate of V75 is coupled through a resistor 212 to the grid of a tube V76 whose plate is coupled to the plate of diode V62. When the voltage across capacitor 160 has arrived at the positive end of the sweep, the voltage at point E has risen to a high enough positive potential to bring tube V74 into balance with tube V75, and the output of V75 is amplified by tube V76, bringing the voltage across the diode V62 down to zero so as to stop the discharging of capacitor 160. This feedback loop accurately sets the end voltage to which the capacitor is allowed to discharge and holds it at this start position for the remainder of the time that the flyback pulse is on. At the end of this pulse V63 returns to a condition of full conduction and allows the charging pulses from tube V55 to again move the scanning spot. As the scanner also starts at the end of the flyback signal from a controlled start position, both recorder and scanner start their scanning lines together.

In this system it is necessary that the recorder flyback be faster than the scanner so it will arrive at its start position before the scanner. It will then be ready to start in synchronism with the scanner. The recorder flyback timing is therefore adjusted to be faster than that of the scanner so that the recorder will have a three or four millisecond wait at the start of each line.

Only one rate of scanning is required for the yoke current of the flying spot scanning cathode ray tubes. This is a linear increase in yoke current at such a rate that a total of $\frac{1}{6}$ of a second of "on" time will scan the 8-inch usable line. For white, the total "on" time per half cycle is $\frac{3}{4} \times \frac{1}{3600}$ or $\frac{1}{4800}$ sec. A total of 800 half cycles will add to $\frac{1}{6}$ second, so the 8-inch line is scanned in $\frac{800}{3600}$ or 0.222 second. Each half cycle of the 1800 cycle white frequency represents one picture element giving 100 elements per inch.

For black, the time "on" per half cycle will be $\frac{1}{4} \times \frac{1}{4800}$ or $\frac{1}{19,200}$ second. A total of 3200 such half cycles of the 2400 cycle carrier are required to add to $\frac{1}{6}$ second, so the 8-inch line will be scanned in $\frac{3200}{4800}$ or 0.667 second. Each half cycle of the 2400 cycle black frequency represents $\frac{1}{4}$ picture element.

In this manner a 3 to 1 speed ratio is obtained, 0.222 second per line to 0.667 second per line. With a steady beam current in the recorder a 3 to 1 density ratio would be obtained, but as this is not adequate contrast, the recording beam is keyed off while the spot is moving during the "on" time of each pulse, and turned on while the spot is stationary. In this way each black element gets a total exposure of $\frac{3}{4} \times \frac{1}{4800} \times 4$ or $\frac{1}{1600}$ second. Each white picture element gets an exposure of $\frac{1}{4} \times \frac{1}{3600} \times 1$ or $\frac{1}{14,400}$ second. The black exposure time is 9 times the white, and adequate contrast for good half toning is obtained. In practice this FM detection system has been found to be simple to adjust, and reliable in operation.

What is claimed is:

1. A frequency modulation circuit comprising energy storage means; first current conducting means connected to said energy storage means for charging said energy storage means toward a voltage of a first polarity; a trigger circuit having an input and an output, the input thereof being connected to said energy storage means; second current conducting means connected to said energy storage means, and controlled by voltages from said trigger circuit output and said first current conducting means, for charging said energy storage means to a voltage of a polarity opposite said first polarity, said first and second current conducting means being alternately operative depending upon the condition of said trigger circuit; modulating means connected to said first current conducting means for controlling the level of conduction thereof; and amplifying and clipping means connected to said energy storage means for converting the output thereof to a near sine wave.

2. A frequency modulation circuit comprising energy storage means; a first electron discharge device having an input electrode and first and second output electrodes, said first output electrode being connected to said energy storage means; a second electron discharge device having an input electrode connected to said storage means and an output electrode; a bistable trigger circuit connected to said second discharge device output electrode; a differential amplifier circuit having a first input coupled to said second output electrode of said first electron discharge device, a second input coupled to said trigger circuit, and an output connected to said storage means; means connected to the input electrode of said first electron discharge device for modulating the flow of current therein and thereby modulating the energy flow in said storage means; and output means connected to said second electron discharge device output electrode.

3. The frequency modulation circuit of claim 2 further comprising means connected to said energy storage means for decreasing the output thereof to zero during a predetermined period.

4. The frequency modulation circuit of claim 3 wherein said energy storage means comprises a capacitor.

5. A frequency modulation system comprising means for generating a triangular wave, the positive and negative going slopes of which are each individually dependent upon a modulating signal; means connected to said generating means for modulating the frequency of said triangular wave; clipping means connected to said generating means for converting said triangular wave into a near sine wave; output means connected to said clippnig means; first and second limiter amplifiers, said first limiter amplifier being directly connected to said output means; a phase shift network connecting said output means to said second limiter amplifier; means connected to said first and second limiter amplifiers for adding the outputs thereof; and means connected to said adding means for providing a full wave rectification of the signal appearing at the output of said adding means.

6. A variable velocity facsimile system comprising means to scan an image to be transmitted by a beam of light; light sensitive means positioned near said image for producing a modulating signal, the variations of which are proportional to changes in the intensity of light reflected from said image; means connected to said light sensitive means for generating a frequency modulated triangular wave, the positive and negative slopes of which are individually dependent upon the signal produced by said light sensitive means; clipping means for converting said triangular wave into a near sine wave; output means connected to said clipping means; a first limiter amplifier connected to said output means; a second limiter amplifier; a phase shift network connecting said output means to said second limiter; means connected to said first and second limiters for adding the outputs thereof; means connected to said adding means for providing a full wave rectification of the signal appearing at the output of said adding means; and sawtooth generator means connected to said full wave rectification means for producing a sawtooth wave the slope of which corresponds to the output of said rectification means, said sawtooth generator means being connected to said scanning means to control the rate of scanning.

7. The variable velocity facsimile system of claim 6 further comprising means connected to said sawtooth generator means for generating a flyback pulse; means connecting said flyback means to said triangular wave generating means for decreasing the amplitude of the output thereof in response to the flyback pulse; an amplitude modulation detector connected to said output means; and driving means for advancing said image one line during each flyback period, said amplitude modulation detector being connected to said driving means and to said sawtooth generator.

8. A variable velocity facsimile system comprising means for generating a frequency modulated signal, the frequency of which varies with the information contained in a scanned image; a first limiter connected to said generating means; a second limiter; a phase shift network connected between said generating means and said second limiter; first and second bistable multivibrators each having two outputs which are out of phase with respect to each other, said first limiter being connected to said first multivibrator and said second limiter being connected to said second multivibrator; first adding means connected to the first outputs of said first and second multivibrators; second adding means connected to the second outputs of said multivibrators; pulse combining means connected to said first and second adding means for producing an output pulse whenever both inputs to said first adder or both inputs to said second adder are positive; a capacitor for generating a sawtooth waveform; current control means coupling said pulse combining means to said storage means; scan control means for determining rate at which the image is scanned; amplifier means for connecting said capacitor to said scan control means; and means for discharging said capacitor.

9. The variable velocity facsimile system of claim 8 further comprising means connected to said scan control means for generating a flyback pulse in response to the completion of scanning of a line.

10. The variable velocity facsimile system of claim 9 further comprising amplitude modulation detector means connected to said generating means for providing an output in response to said flyback pulse; driving means connected to said amplitude modulation detector means for advancing said image one line in response to said flyback pulse; and means connected to said amplitude modulation detector means for discharging said capacitor during the period of said flyback pulse.

11. A variable velocity facsimile system comprising means for generating a frequency modulated signal, the frequency of which varies with the information contained in a scanned image; means for decreasing the amplitude of said frequency modulated signal during the flyback period thereby amplitude modulating said frequency modulated signal; means for transmitting said signals; a phase shift network; a first limiter directly coupled to said transmission means; a second limiter coupled to said transmission means by said phase shift network; means coupled to said limiters to add the outputs thereof; means connected to said adder means for providing a full wave rectification of the output thereof; means for reproducing said scanned image; brilliance control amplifier means connecting said rectification means to said reproducing means; and sawtooth generator means connecting said rectification means to said image reproducing means so that the rate said image is reproduced is dependent upon the detected signal output of said rectification means.

12. The variable facsimile system of claim 11 further comprising an amplitude modulation detector connected to said transmission means; driving means for advancing the material upon said image is being reproduced the output of said amplitude modulation detector being connected to said sawtooth generator and to said driving to control the synchronism thereof.

References Cited by the Examiner

UNITED STATES PATENTS

| | | | |
|---|---|---|---|
| 2,901,538 | 8/1959 | Artzt | 178—6 |
| 3,150,272 | 9/1964 | Gard | 307—88.5 |

DAVID G. REDINBAUGH, *Primary Examiner.*

J. A. ORSINO, *Assistant Examiner.*